(12) United States Patent
Kung et al.

(10) Patent No.: US 6,525,815 B2
(45) Date of Patent: Feb. 25, 2003

(54) MINIATURIZED TALBOT SPECTROMETER

(75) Inventors: Helen L. Kung, Stanford, CA (US); David A. B. Miller, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 10/007,796

(22) Filed: Nov. 9, 2001

(65) Prior Publication Data

US 2002/0126279 A1 Sep. 12, 2002

Related U.S. Application Data

(60) Provisional application No. 60/247,409, filed on Nov. 10, 2000.

(51) Int. Cl.$^7$ ................................ G01J 3/28; G01J 3/45
(52) U.S. Cl. ........................................ 356/328; 356/451
(58) Field of Search ................................ 356/328, 451, 356/488, 499, 506, 330, 331, 332, 334

(56) References Cited

PUBLICATIONS

A.W. Lohmann, "Proceedings of the Conference on Optical Instruments and Techniques," London (Wiley, New York, 1961), p. 58.

Primary Examiner—Frank G. Font
Assistant Examiner—Layla Lauchman
(74) Attorney, Agent, or Firm—Lumen Intellectual Property Services, Inc.

(57) ABSTRACT

A transform spectrometer determines the spectrum of light based on the Talbot effect. Light to be analyzed is passed through a spatially periodic object, thereby generating a series of Talbot images. The intensities of these Talbot images at different optical distances from the spatially periodic object are then detected, and Fourier transformed to determine the spectrum of the light. Preferably, the detector comprises a spatial masking pattern such that the intensities detected are maximized at Talbot planes or at the midpoints between Talbot planes. In one embodiment, the optical distance between the spatially periodic object and the detector is changed in order to detect image intensities at different Talbot planes. In another embodiment, the detector and the spatially periodic object are positioned along a common optical axis at relative angle θ such that different detector rows detect intensities at different Talbot planes. In yet another embodiment, the spatially periodic object is both a grating and a detector, and the Talbot images generated by the grating are reflected off a mirror back to the detector.

14 Claims, 6 Drawing Sheets

MINIATURIZED TALBOT SPECTROMETER

CROSS-REFERENCE TO RELATED APPLICATIONS

This application claims priority from U.S. provisional application No. 60/247,409 filed Nov. 10, 2000, which is incorporated herein by reference.

STATEMENT REGARDING FEDERALLY SPONSORED RESEARCH OR DEVELOPMENT

This invention was supported by contract number MDA972-98-1-0002 from DARPA. The Government has certain rights in the invention.

FIELD OF THE INVENTION

This invention relates generally to spectrometers and spectral sensors. More particularly, it relates to novel types of compact spectrometers based on the Talbot effect.

BACKGROUND ART

Most existing spectrometers are bulky because of their use of gratings, prisms or large interferometers. These spectrometers are not suitable for a variety of potential applications which require very compact spectrometers, e.g., spectrometer arrays. Compact spectrometer arrays would also benefit from spectrometers having a linear architecture, so that each pixel of an image may be analyzed by its own spectrometer. In order to be useful, such spectrometers would need to provide adequate resolution and be sufficiently inexpensive to manufacture. A technique for wavelength measurement has been described by A. W. Lohmann, in *Proceedings of the Conference on Optical Instruments and Techniques*, London (Wiley, N.Y., 1961), p. 58. A spectrometer built according to Lohmann's teaching, however, would not be sufficiently compact for many applications and would have moving parts that would decrease its reliability. There is therefore a need for spectrometers that are reliable, compact, have a linear architecture, have high resolution, and are inexpensive to manufacture.

SUMMARY

The present invention provides compact, inexpensive, nanometer-resolution spectrometers that are designed to sense, monitor, and process the spectral content of images. These spectrometers are ideally suited for hand-held spectral imaging and sensing systems. The advance of MEMS (Micro-Electro-Mechanical-Systems) technology has made possible various types of small spectrometers, including Fabry-Perot interferometers, grating-based spectrometers, and standing wave spectrometers. This invention, however, provides a novel type of miniaturized spectrometer based on the Talbot effect.

According to one aspect of the invention, the spectrometers realize a novel method for determining the spectrum of light based on the Talbot effect. Light to be analyzed is passed through a spatially periodic object, thereby generating a series of Talbot images. The intensities of these Talbot images at different optical distances from the spatially periodic object are then detected, and Fourier transformed to determine the spectrum of the light. In one embodiment, the detector comprises a spatial masking pattern such that the intensities detected are maximized at Talbot planes or at the midpoints between Talbot planes. The optical distance between the spatially periodic object and the detector is changed in order to detect image intensities at different Talbot planes (i.e., at the Talbot planes themselves as well as at intermediate distances between the planes). In another embodiment, the detector and the spatially periodic object are positioned along a common optical axis at relative angle θ such that different rows of a detector array detect intensities at different Talbot planes. In yet another embodiment, the spatially periodic object is both a grating and a detector, and the Talbot images generated by the grating are reflected off a mirror back to the detector. Such a spatially periodic object may comprise, for example, a transparent substrate patterned with doped-intrinsic-doped regions. The optical distance between the mirror and the spatially periodic object may be changed, or the mirror and the spatially periodic object may be positioned along a common optical axis at relative angle θ such that different detector rows detect intensities at different Talbot planes.

This novel class of transform spectrometers are simple, compact, low-cost, high precision, and versatile. These novel transform spectrometers are well suited for a variety of applications involving spectral imaging and sensing. Unlike typical transform spectrometers, embodiments of the present invention may be constructed without any moving parts, thus increasing reliability. The spectrometer also enjoys the multiplexing advantage of other types of transform spectrometers, i.e. the presence of all frequencies of light at the detector at all times provides an increased signal-to-noise ratio. As with other more common transform spectrometers, there is no free spectral range to limit the spectral sensing region. Only the detector response limits the range. Hence spectrometers of the present invention may be useful when a large wavelength range is needed in a compact device.

DETAILED DESCRIPTION

Figure 1:
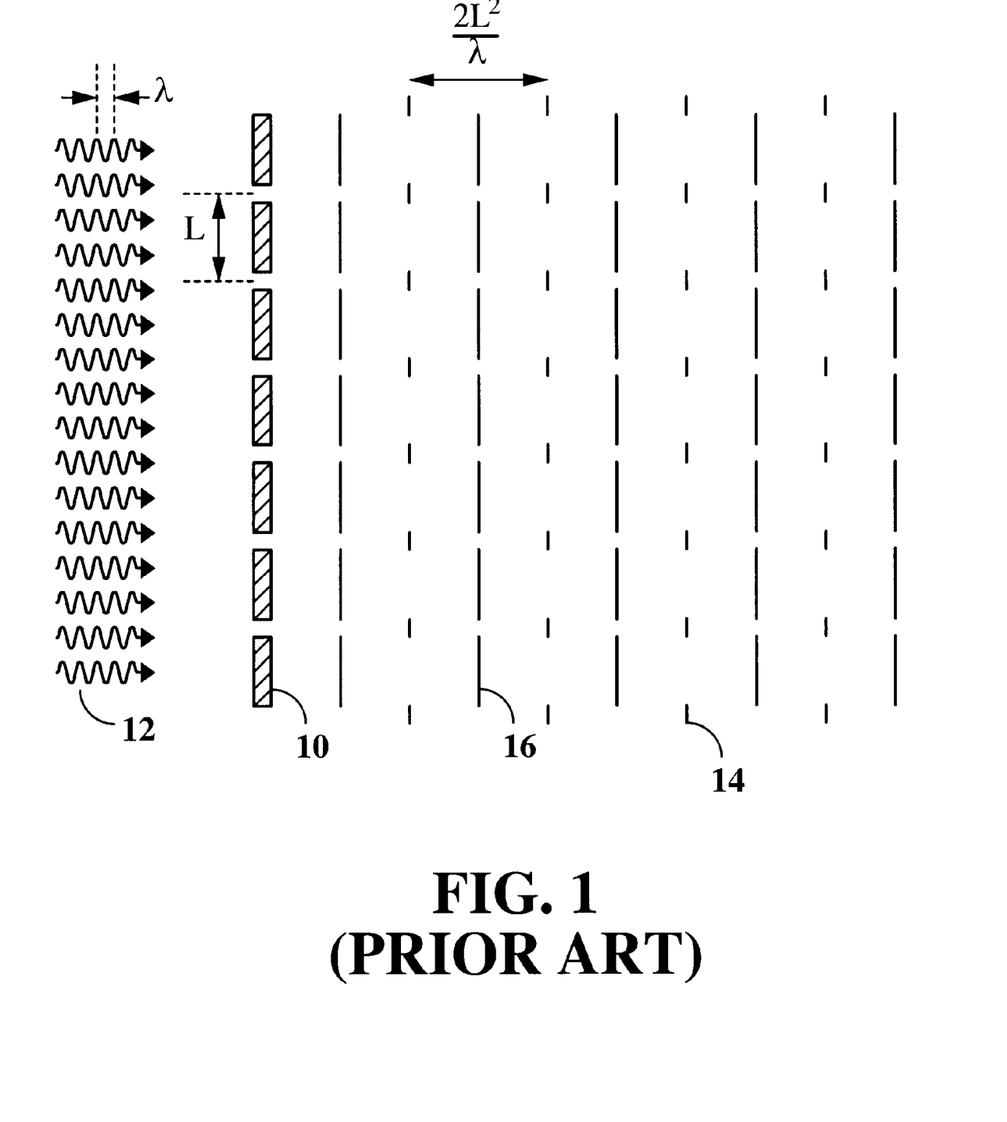
FIG. 1 is a cross-sectional illustration of the Talbot effect, as is well known in the art.

Particular embodiments of the present invention will now be described in detail with reference to the drawing figures. A key novel feature of the spectrometers of the present invention is their use of the Talbot effect as the underlying principle of their operation. The Talbot effect is an optical interference effect first described by H. F. Talbot in 1836. As illustrated in FIG. 1, when a spatially periodic object 10 (such as a grating) of periodicity L is illuminated with spatially coherent light 12 of wavelength $\lambda$, a periodic series of self-images of the object 14 (called Talbot images) are produced in the Fresnel (i.e., near-field) region behind the object. These self-images appear in discrete planes (called Talbot planes) which are separated from each other by a distance of $2L^2/\lambda$, where L is the grating period, $\lambda$ is the wavelength of the illuminating light, and it is assumed that $L \gg \lambda$. These self-images of the object appearing at distances of $2 nL^2/\lambda$ are interleaved with their opposite-images 16 which appear at distances of $(2 n+1)L^2/\lambda$, where n ranges over positive integers. The images are replicated out to a distance of approximately $WL/2\lambda$ from the grating, where W is width of the grating or of the illuminating light beam, whichever is smaller.

Figure 2:
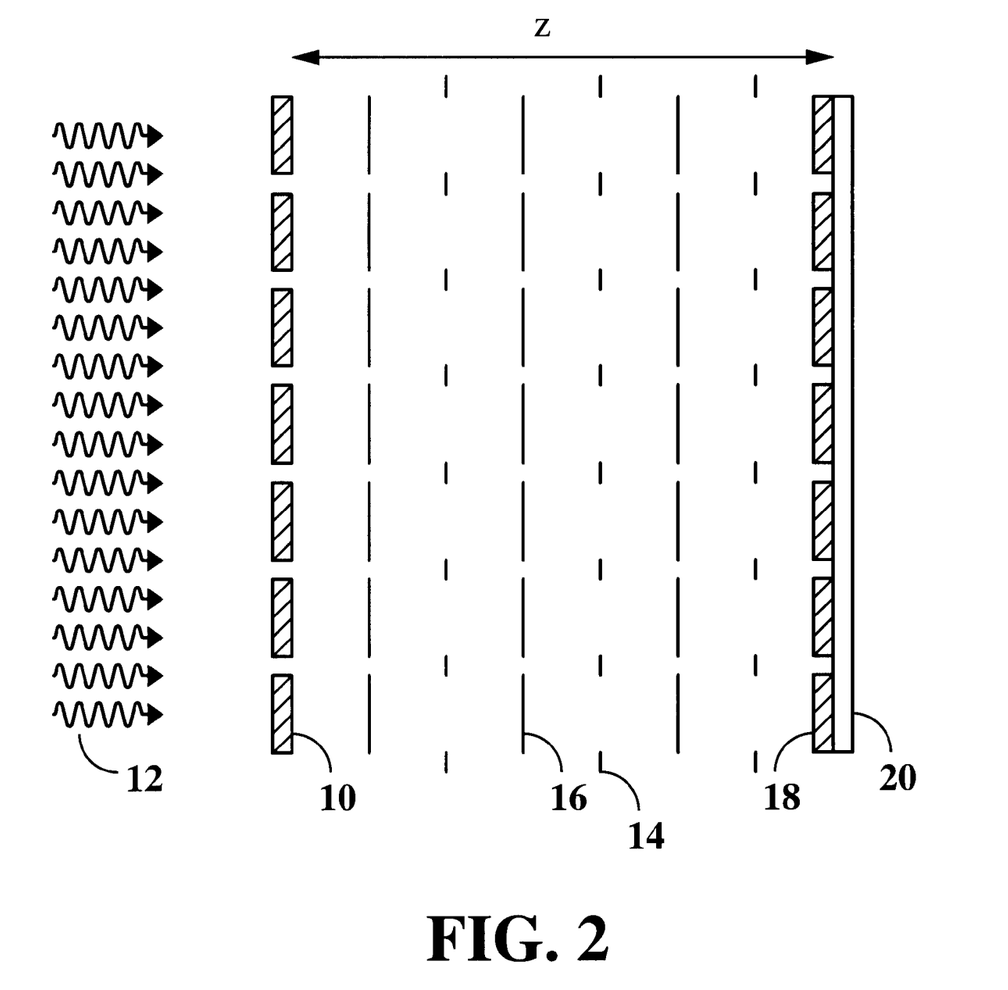
FIG. 2 is a cross-sectional view of an apparatus illustrating the principle of the present invention.

The present inventors have discovered that the Talbot effect can be used to construct a new and very compact Fourier transform spectrometer. Because the spacing of the Talbot self-image planes is proportional to $1/\lambda$, the wavelength of the illuminating light can be determined by measuring the periodicity of the self-images. As shown in FIG. 2, when a replica 18 of the spatially periodic object 10 is placed just in front of the face of a detector 20, the detected light intensity will be a maximum when the detector is positioned at a Talbot plane 14 and a minimum when the detector is positioned at a midpoint 16 between Talbot planes. The periodicity can thus be measured by determining the Talbot distances z, i.e., the distances corresponding to the maxima and/or minima of the detector intensity profile.

When the illuminating light 12 has several distinct wavelengths, this produces several distinct series of Talbot self-images, each series having its distinct Talbot planes separated by a different distance. Each wavelength has its corresponding Talbot self-image and opposite-image locations. The total detected intensity at a given distance z is the sum of all the intensities of the Talbot images at that distance produced by all wavelengths that are present in the spectrum. By taking the Fourier transform of the intensity profile with respect to distance z, it is possible to determine the spectrum of the illuminating light. This is the basic principle of operation of the spectrometers of the present invention. As will be evident from the following embodiments, there are various ways to construct spectrometers based on this idea.

Figure 3:
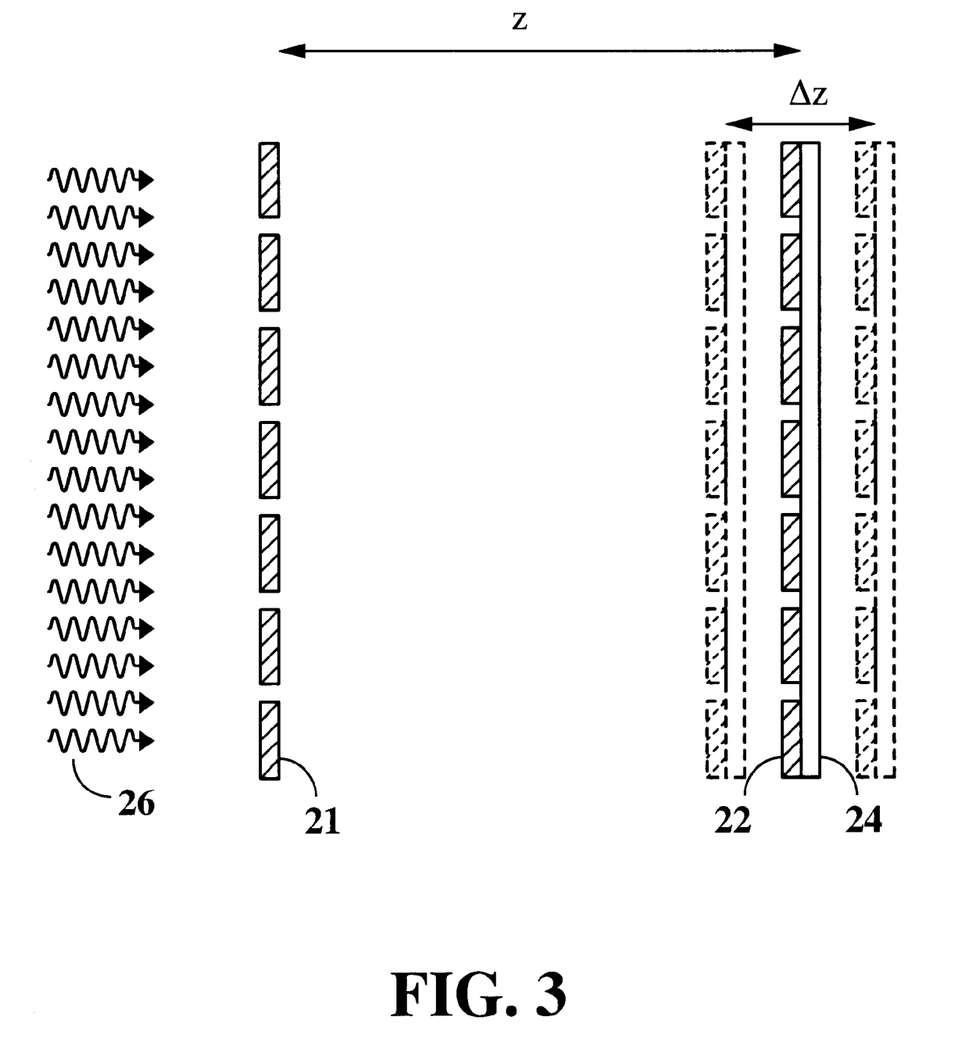
FIG. 3 is a cross-sectional view of a first embodiment of the present invention wherein the detector is translated in order to permit the detection of different Talbot images.

As illustrated in FIG. 3, a first embodiment of the present invention comprises a first spatially periodic object 21 (e.g., a grating), a second spatially periodic object 22 having the same periodicity pattern as the first object 21, and a detector 24 positioned in contact with, or in very close proximity to the second spatially periodic object 22. In the present context, a spatially periodic object is defined as a planar or approximately planar object having spatial periodicity in one and/or two spatial dimensions of its plane (e.g., a grating with horizontal and/or vertical lines). For simplicity, the term "grating" will be used hereafter to refer to any such spatially periodic object, and its "pattern" will be used to refer to its particular pattern of spatial periodicity.

The two gratings 21 and 22 are oriented parallel to each other and positioned perpendicular to a common optical axis with their patterns rotationally aligned. The gratings are separated by a distance z along the optical axis, as shown. Light 26 is directed at a normal or near-normal incidence to the plane of the first grating 21. The first grating thus generates Talbot images in accordance with the Talbot effect. The second grating 22 masks the light so as to only allow Talbot image intensities to pass through to the detector 24, which is placed directly behind the second grating 22. The detector 24 thus measures the intensity of the various Talbot images appearing at a given distance z. The distance z between the first grating 21 and the combination of the second grating 22 and the detector 24 is then changed, and the intensity is again measured. Thus the intensities over a range $\Delta z$ of distances are measured to produce a set of intensity values as a function of distance. A signal processor (not shown) then analyzes these intensity values to produce spectral information. For example, the intensity values with respect to distance z can be Fourier transformed to obtain a set of intensity values as a function of wavelength, i.e., the spectrum of the illuminating light. It is not necessary, however, to perform a Fourier transform in order to obtain valuable spectral information. The untransformed intensity values contain spectral information and can be used to identify and/or distinguish materials having known spectral signatures. The signal processor in this type of application can, for example, analyze and the intensity values and compare them to stored sets of intensity values corresponding to materials with known spectral signatures.

In a variation of this embodiment, the second grating 22 and detector 24 are not distinct components but are integrated into a single component. For example, a metal-semiconductor-metal (MSM) detector is used as the second grating and detector. The fingers of the MSM detector are patterned the same as a simple square absorption grating which is used as the first grating 21. Typically, the first grating has a pattern of alternating lines and spaces of equal width, normally on the order of a few microns.

The detector 24 preferably is provided with an antireflective coating and has a flat frequency response profile over a predetermined range of wavelengths. If the response is not flat, however, additional circuitry may be used to compensate by appropriately scaling the calculated spectrum. As is known in the art, it may be necessary or preferable to provide the detector with amplification circuitry and/or filtering circuitry prior to sending the signals to be Fourier transformed.

The relative distance z is varied by controlled movement of the components 21 and/or 22 and 24 using any of various techniques known in the art. There are many possible mechanisms for providing this relative movement, such as various electromechanical means. For example, the detector and second grating can be fabricated or mounted upon a fabricated membrane or cantilever structure. An electrical driver is then used to cause oscillation of the membrane or cantilever, resulting in the desired relative movement in the z direction. The electrical driver could be a variable voltage source which creates electrostatic attraction and/or repulsion. It is worth mentioning that it is also possible to effectively vary the relative distance z without any moving parts by providing a medium with a variable index of refraction between the gratings. By altering the medium's index of refraction, the optical distance is changed and the position of the Talbot planes are shifted. This has the same effect as changing the physical distance z, and has the advantage of not requiring any moving parts.

Figure 4:
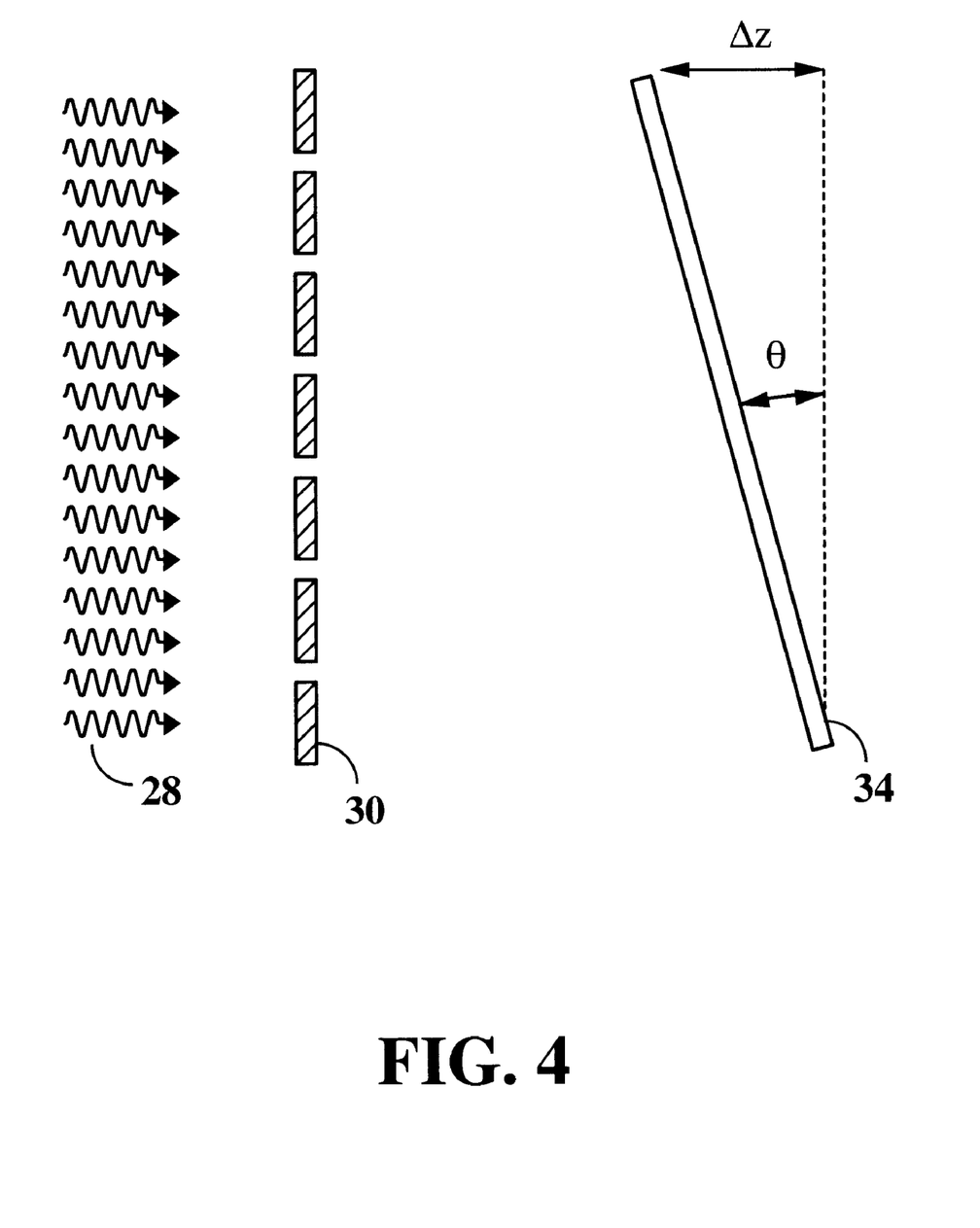
FIG. 4 is a cross-sectional view of a second embodiment of the present invention wherein the detector is positioned at a small angle to permit the detection of different Talbot images at its different rows.

A second embodiment of the present invention, shown in FIG. 4, does not require mechanical movement of the components. In this embodiment, light 28 passes through a first grating 30 and generates Talbot images, just as before. A CCD or other type of detector array 34, however, is fixed at a small angle θ, as shown. As a result, different parts of the detector detect Talbot images at different distances, covering a range of $\Delta z$. The same effect can be produced by fabricating the detector in the form of a "staircase." In either case, each row of pixels in the array measures the image intensity at a different distance in the z-direction. As a result, the various rows together provide a measure of the periodicity of the Talbot self-images. An advantage of this embodiment is that it does not involve any moving parts, and is able to measure the intensities at all the distances simultaneously. It should be noted that, instead of tilting the second detector, the first grating may be tiled instead. In either case, the detector rows will be positioned at different relative distances z. If the pixel size of the detector array 34 is smaller than the separation of the grating lines, then the Talbot images should be magnified, e.g., by providing a lens between the grating and the detector. It should also be noted that the detector array is not necessarily a 2D array of pixels, but may consist of a 1D array of detector row elements.

Regardless of the method for measuring intensity data at different distances z, it is preferable to measure intensities over a sufficiently large range $\Delta z$ of distances in order to provide good resolution. In order to resolve two wavelengths $\lambda_1$ and $\lambda_2$, it is desirable to have $\Delta z$ be sufficiently large that it spans a different number of Talbot periods for each wavelength. For example, if the Talbot period for $\lambda_1$ is 100 microns and the Talbot period for $\lambda_2$ is 90 microns, then the displacement $\Delta z$ should be at least 1 mm in order to resolve these two wavelengths. It is also desirable to make a sufficient number of intensity measurements within the range $\Delta z$ so that the periodic Talbot image intensity levels are not under-sampled.

Figure 5:
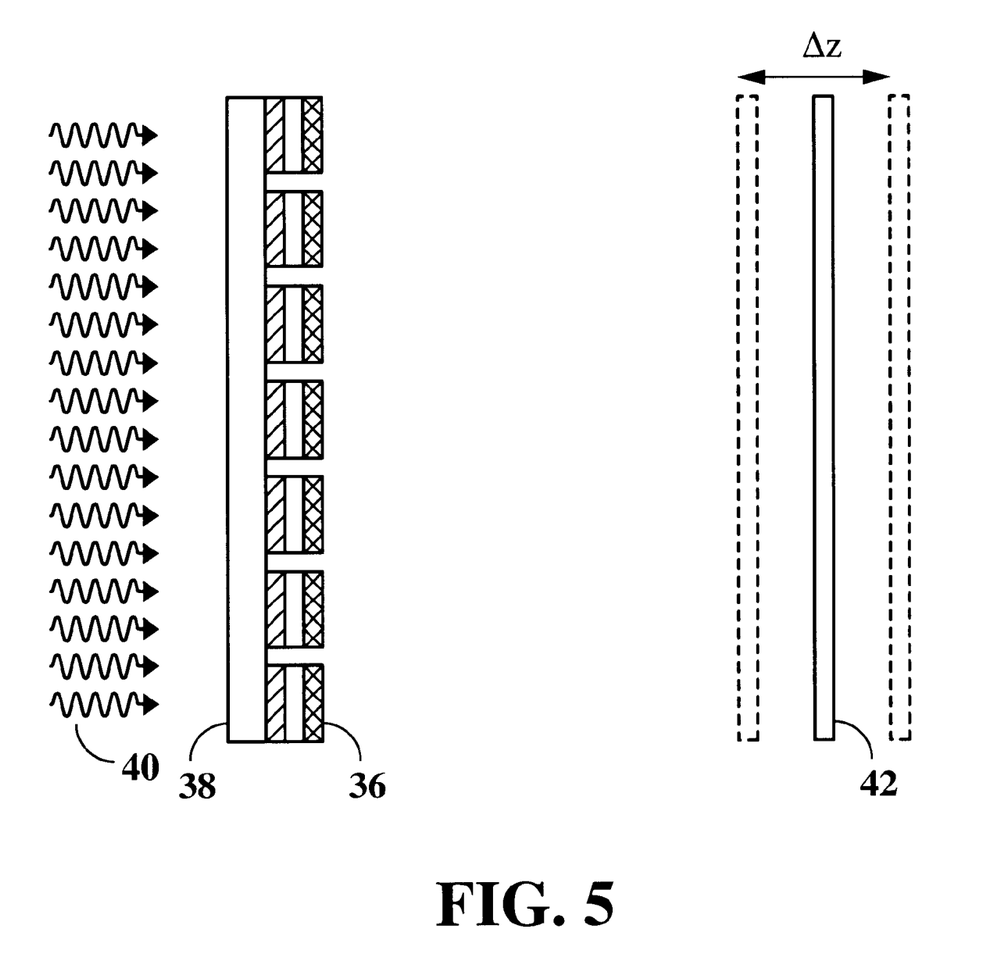
FIG. 5 is a cross-sectional view of a third embodiment of the present invention wherein the grating and detector are integrated into a single object and a moving mirror is used to reflect the generated Talbot images back to the object.

In a third embodiment of the present invention, shown in FIG. 5, a single structure is made both to generate and to detect Talbot self-images. The structure comprises a periodic array of detectors 36 grown on a transparent substrate 38. The device works by shining light 40 though the structure, reflecting the diffracted light off a mirror 42 and then detecting the reflected light with the detectors 36. The structure, for example, can be made of vertically grown PIN detectors. Other types of detectors, such as vertical stacks of PIN diodes or photoconductors (PIP or NIN) grown on a transparent substrate, can also be used. Each detector element has a thick doped region grown on the substrate, an intrinsic region grown on the thick doped region, and a thin doped region grown on the intrinsic region. Light 40 passes through the transparent substrate and either passes between the detectors or is absorbed in the thick doped (N or P) region of each detector and thus does not generate significant photocurrent. Reflected light from the mirror 42, on the other hand, passes through the thin doped region and is absorbed in the intrinsic region, thus generating current. Therefore, by fabricating such vertical detectors composed of a stack of doped-intrinsic-doped regions with the bottom doped region sufficiently thick, the detector thus constructed acts in one direction as an absorption grating without generating any current in the detector. In the other direction, the doped top region (the layer closer to the mirror) is sufficiently thin so that most of the reflected light is transmitted through the doped region and absorbed in the intrinsic region, thereby allowing the device to act as a detector. Using this device, when the diffracted light bounces off the mirror and returns, if the round trip distance is a Talbot distance, then the detectors will detect minimal light intensity since no detectors exist at the Talbot image. Conversely, if the round trip distance is a Talbot reversal image, the signal strength is maximized. It is thus evident that the spectrometers of the present invention may be designed so that the detector signal is maximized at Talbot planes or at mid-points between Talbot planes. In other words, the pattern used for the detector gratings in all the embodiments can be either a replica of the pattern of the first grating, or its complementary pattern.

Figure 6:
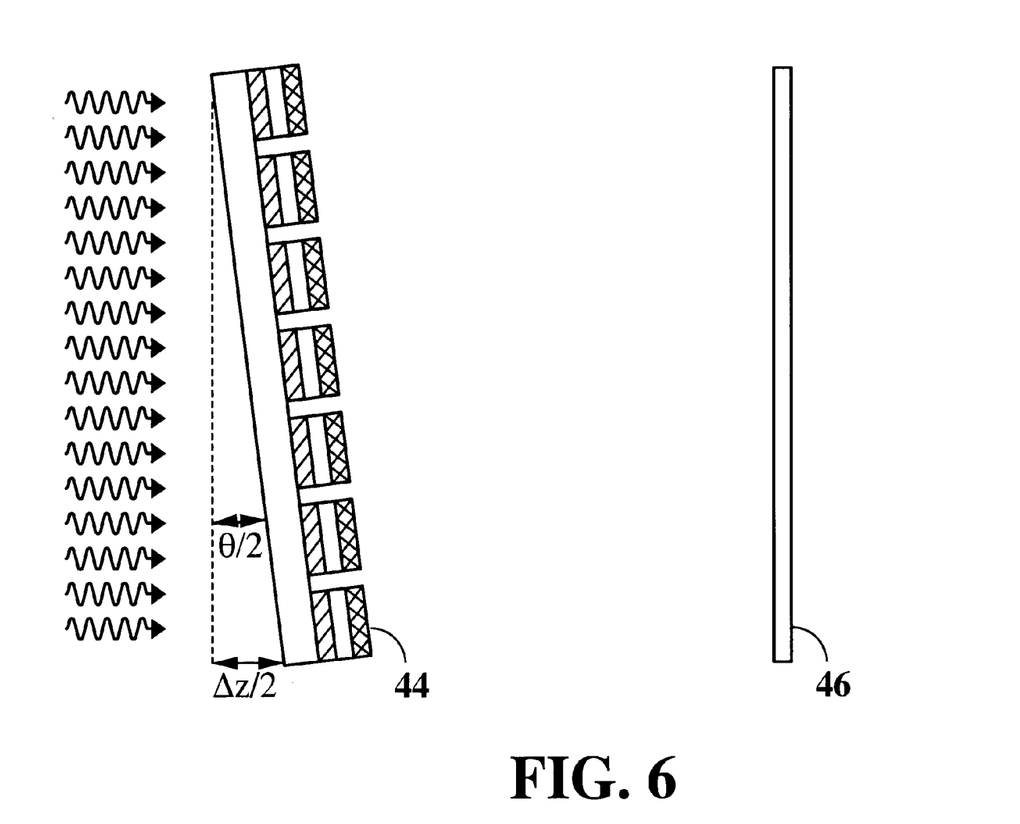
FIG. 6 is a cross-sectional view of a fourth embodiment of the invention wherein a grating-detector is positioned at a small angle relative to a mirror to permit the detection of different Talbot images at different detector rows.

The relative distance between the grating and the detectors can be changed by moving the z-position of the mirror 42 relative to the detector-grating 36. The techniques described with reference to FIG. 3 may also be used in this embodiment to mechanically or optically change the relative distance z. Alternatively, the grating-detector 44 may be tilted at a fixed angle relative to the mirror 46, as shown in FIG. 6. The operation of this embodiment is similar to that described with reference to FIG. 4, except that only half the tilt is required to produce the same total displacement. The same effect can also be obtained by tilting the mirror 46 at a fixed angle instead of, or in addition to tilting the grating-detector 44.

Figure 7:
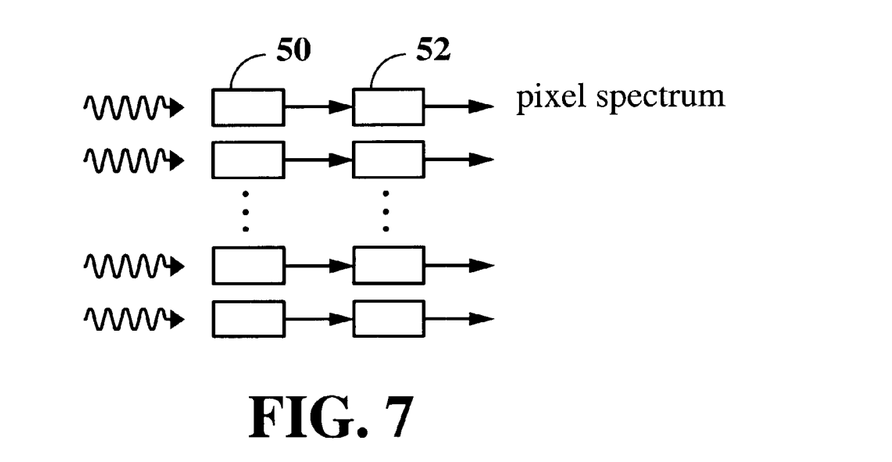
FIG. 7 is a diagram illustrating an array of spectrometers and associated circuitry according to one embodiment of the present invention.

Those skilled in the art will appreciate that various other arrangements of optical components can be used to make spectrometers similar to those described above. The embodiments shown in FIGS. 3–6, as well as other similar designs, are preferably constructed at a very small scale using standard microfabrication techniques. These techniques allow the spectrometers to be miniaturized, manufactured automatically, and in large quantities. These techniques also allow many spectrometers to be integrated in an array together with associated electronic circuitry. Such an array of spectrometers, as shown in FIG. 7, would provide a separate spectrometer 50 at each pixel of the array. Displacement control circuitry (if needed), signal compensation circuitry, and Fourier transform circuitry could be provided on a separate circuit, or as part of the same integrated electro-optical device. An array of parallel circuits 52 for performing any or all of these operations, one circuit 52 for each spectrometer 50, would provide spectral analysis of thousands or millions of pixels simultaneously.

What is claimed is:

1. A method for determining the spectrum of light based on the Talbot effect, the method comprising:

a) passing the light through a spatially periodic object generating a series of Talbot images;

b) detecting intensities of the Talbot images at different optical distances from the spatially periodic object; and c) analyzing the detected intensities to obtain spectral information for the light.

2. The method of claim 1 wherein the detector comprises a spatial pattern such that the intensities detected are maximized at Talbot planes or at the midpoints between Talbot planes.

3. The method of claim 1 further comprising changing the optical distance between the spatially periodic object and the detector.

4. The method of claim 1 further comprising positioning the detector and the spatially periodic object along a common optical axis at relative angle $\theta$ such that different detector rows detect intensities at different Talbot planes.

5. The method of claim 1 wherein the spatially periodic object is both a grating and a detector, and wherein the method further comprises reflecting the Talbot images off a mirror back to the detector.

6. The method of claim 5 further comprising changing the optical distance between the mirror and the spatially periodic object.

7. The method of claim 5 further comprising positioning the mirror and the spatially periodic object along a common optical axis at relative angle $\theta$ such that different detector rows detect intensities at different Talbot planes.

8. The method of claim 5 wherein the spatially periodic object comprises a transparent substrate patterned with doped-intrinsic-doped regions.

9. A transform spectrometer employing the Talbot effect, the spectrometer comprising:
   a) a first grating having a first spatially periodic pattern generating a sequence of Talbot images from incident light;
   b) a second grating having a second spatially periodic pattern similar to the first spatially periodic pattern, wherein the first grating and the second grating are positioned parallel to each other, perpendicular to a common optical axis, separated by a distance z along the optical axis, and oriented with their patterns rotationally aligned;
   c) an optical detector fixed in a position next to the second grating so that light passing through the first and second gratings can be detected, wherein the detected light has a maximum intensity when the distance z corresponds to the position of a Talbot plane;
   d) a mechanism for changing the distance z between the first grating and the second grating; and
   e) a circuit connected to the optical detector for detecting signal intensity values corresponding to various distances z, and for analyzing the signal intensity values to obtain spectral information for the light.

10. A transform spectrometer employing the Talbot effect, the spectrometer comprising:
   a) a first grating having a first spatially periodic pattern generating a sequence of Talbot images from incident light;
   b) an optical detector array positioned along an optical axis common with the first grating at an angle θ relative to the first grating so that light passing through the first grating can be detected, wherein the detected light has a maximum intensity along rows of the detector array corresponding to the positions of Talbot planes; and
   c) a circuit connected to the optical detector array for detecting signal intensity values corresponding to various rows of the array, and for analyzing the signal intensity values to obtain spectral information for the light.

11. A transform spectrometer employing the Talbot effect, the spectrometer comprising:
   a) a grating-detector having a spatially periodic pattern generating from light incident from a first side of the grating-detector a sequence of Talbot images on a second side of the grating-detector;
   b) a mirror positioned such that the sequence of Talbot images are reflected back toward the second side of the grating-detector; wherein the second side of the grating-detector detects the reflected Talbot images; and
   c) a circuit connected to the optical detector for detecting signal intensity values, and for analyzing the signal intensity values to obtain spectral information for the light.

12. The spectrometer of claim 11 further comprising a mechanism for changing a distance z between the grating-detector and the mirror; and wherein the circuit correlates the signal intensity values to the distance z.

13. The spectrometer of claim 11 wherein the grating-detector comprises rows of detector pixels, and wherein the mirror and the grating-detector are positioned along a common optical axis at a relative angle of θ such that the rows of detector pixels intersect distinct Talbot planes.

14. The spectrometer of claim 11 wherein the grating-detector comprises a transparent substrate patterned with doped-intrinsic-doped regions.

* * * * *